United States Patent
Szydlowski

(10) Patent No.: US 8,282,972 B2
(45) Date of Patent: Oct. 9, 2012

(54) METHOD AND SYSTEM FOR RECOVERING AND PREPARING GLACIAL WATER

(76) Inventor: Juan Carlos Szydlowski, Santiago (CL)

( * ) Notice: Subject to any disclaimer, the term of this patent is extended or adjusted under 35 U.S.C. 154(b) by 0 days.

(21) Appl. No.: 13/213,818

(22) Filed: Aug. 19, 2011

(65) Prior Publication Data

US 2011/0300267 A1    Dec. 8, 2011

Related U.S. Application Data

(62) Division of application No. 11/551,125, filed on Oct. 19, 2006, now Pat. No. 8,007,845.

(51) Int. Cl.
*A23L 2/00* (2006.01)
(52) U.S. Cl. .................. 426/66; 426/106; 426/397
(58) Field of Classification Search .......... 426/66, 426/106, 383
See application file for complete search history.

(56) References Cited

U.S. PATENT DOCUMENTS

| | | |
|---|---|---|
| 2,391,926 A | 1/1946 | Scott |
| 3,779,196 A | 12/1973 | Knaus et al. |
| 4,564,450 A | 1/1986 | Piper et al. |
| 4,627,375 A | 12/1986 | Davis et al. |
| 4,810,195 A | 3/1989 | Asmussen et al. |
| 5,032,261 A | 7/1991 | Pyper |
| 5,197,912 A | 3/1993 | Lengefeld |
| 5,413,065 A | 5/1995 | Spragg et al. |
| 5,488,921 A | 2/1996 | Spragg |
| 5,910,248 A | 6/1999 | Tlok |
| 6,047,655 A | 4/2000 | Cran |
| 6,293,217 B1 | 9/2001 | Savage et al. |
| 6,330,865 B1 | 12/2001 | Cran |
| 6,550,410 B2 | 4/2003 | Reimers |
| 6,718,896 B2 | 4/2004 | Davenport |
| 6,808,808 B2 | 10/2004 | Freeman et al. |
| 6,832,571 B2 | 12/2004 | Eagles |
| 7,024,748 B2 | 4/2006 | Eagles |
| 7,077,963 B2 | 7/2006 | McConchie |
| 7,201,624 B2 | 4/2007 | Dyhrberg |
| 7,332,082 B2 | 2/2008 | Brandlmaier |
| 7,500,442 B1 | 3/2009 | Schanz |
| 7,553,418 B2 | 6/2009 | Khudenko et al. |
| 7,564,989 B2 | 7/2009 | Schanz |
| 7,569,148 B2 | 8/2009 | Elefritz et al. |
| 7,740,765 B2 | 6/2010 | Mitchell et al. |
| 7,841,289 B1 | 11/2010 | Schanz |
| 8,007,845 B2 | 8/2011 | Szydlowski |

(Continued)

FOREIGN PATENT DOCUMENTS

CN    1079881    12/1993

(Continued)

OTHER PUBLICATIONS

10 Thousand BC—Luxury Glacier Water, found at http://www.10thousandbc.com, printed Sep. 30, 2010, 3 pages.

(Continued)

*Primary Examiner* — Rena Dye
*Assistant Examiner* — Chaim Smith
(74) *Attorney, Agent, or Firm* — Sheridan Ross P.C.

(57) ABSTRACT

Methods and systems for grouping, recovering, and processing ice obtained from an ice source, i.e., a glacier, ice sheet, ice cap, etc., are described herein. In particular, the ice obtained from the ice source is separated and grouped according to common unique properties and processed as a beverage for consumption having the same unique properties.

8 Claims, 4 Drawing Sheets

U.S. PATENT DOCUMENTS

| | | |
|---|---|---|
| 2004/0144294 A1 | 7/2004 | Yaffe |
| 2008/0235858 A1 | 10/2008 | Schanz |
| 2009/0221983 A1 | 9/2009 | Schanz |
| 2011/0091607 A1 | 4/2011 | Szydlowski |
| 2011/0277678 A1 | 11/2011 | Szydlowski et al. |

FOREIGN PATENT DOCUMENTS

| | | |
|---|---|---|
| EP | 1723021 | 11/2006 |
| WO | WO 00/39408 | 7/2000 |

OTHER PUBLICATIONS

10 Thousand BC trademark, [on line]], [retrieved on Sep. 30, 2010]. Retrieved from the Internet: <URL:http://tess2.uspto.gov/bin/showfield?f=doc&state=4008:gktt2k.2.1 >.

"Alaska Glacier Cap Bottled Water," Fine Waters, Aug. 2004, found at http://web.archive.org/web/20040809211105/www.finewaters.com/Bottled_Water/USA/Alaska_Glacier_Cap.asp, printed Sep. 30, 2010.

Argonne Lab Experiment Simulates Comet Collision, The University of Chicago Chronicle, Apr. 26, 2001, vol. 20, No. 15, 2 pages.

"Bottled Water and Energy A Fact Sheet," © 2008 Pacific Institute, http://www.pacinst.org/topics/water_and_sustainability/bottled_water/bottled_water_and_energy.html, printed Sep. 9, 2009, 2 pages.

"Comet discovered at a crucial ingredient for life," LATERCERA.CL, Aug. 18, 2009, (Mechanical Translation), 2 pages.

"The Fiji Aquifer—450 Year Old Water," FineWaters, Nov. 2003, found at http://web.archive.org/web/20031102060856/finewaters.com/Resources/Water_Science/The_Fiji_Aquifer.asp.

Old Water—10 Thousand BC Luxury Glacier Water, Trendhunter, found at http://www.trendhunter.com/trends/old-water-10-thousand-bc-luxury-glacier-water, printed Sep. 30, 2010, 2 pages.

"Report 4 of 5: Water Cigars—Greece," Hands On—The Earth Report from TVE.org, Series 2: Programme 10 of 14—WaterWays, 4 pages, 2004, http://www.tve.org/ho/series2/waterways_reports/watercigars_greece.html.

"Soil and Aquifer Properties and Their Effect on Groundwater," found at http://www.co.portage.wi.us/groundwater/undrstnd/soll.htm, printed Sep. 21, 2009, 8 pages.

"Terroir" Wikipedia, found at http://en.wikipedia.org/wiki/Terroir, printed Sep. 21, 2009, 6 pages.

"What if Greenland was Africa's water fountain?" Pruned, Oct. 2, 2006, http://pruned.blogspot.com/2006/10/what-if-greenland-was-africas-water.html, 5 pages.

Alfredo, "Carbon Dating Bottled Water," Fine Waters Vintage, Jul. 4, 2004 found at http://www.finewaters.com/Bottled_Water_Etiquette/Flavor_of_Water/FineWaters_Vintage/Print.asp.

Christner et al., "Recovery and Identification of Viable Bacteria Immured in Glacial Ice," Icarus vol. 144, Iss. 2, Apr. 2000, (Abstract) 3 pages.

Doyle "Sea-Going Water Bags to Quench World Thirst?" Reuters, Nov. 27, 2011, 4 pages.

Felton, "A Fashion Trend Meets a Watery Grave," The Wall Street Journal, Aug. 6, 2009, 2 pages.

Haeberli, "Absolute and Relative Age Dating of Rock Glacier Surfaces in Alpine Permafrost," European Geological Society, Geophysical Research Abstracts, Apr. 2003, 2 pages, vol. 5, Issue 10890.

Hajim, "Iceberg Hunters," FORTUNE, Nov. 14, 2005, 1 page.

Mascha, "The Age of Water—How Old is Your Water?" Fine Waters, Mar. 2, 2005, found at http://www.finewaters.com/Bottled_Water_Etiquette/Bottled_Water_History/The_Age_of_Water_How_Old_is_Your_Water/All_Pages.asp.

Thompson, "The Energy Footprint of Bottled Water," Live Science, Mar. 18, 2009, 1 page.

International Search Report for International (PCT) Application No. PCT/US2010/052864, mailed Dec. 28, 2010.

Written Opinion for International (PCT) Application No. PCT/US2010/052864, mailed Dec. 28, 2010.

Official Action for U.S. Appl. No. 11/551,125, mailed Jul. 20, 2010 Restriction Requirement.

Official Action for U.S. Appl. No. 11/551,125, mailed Oct. 7, 2010.

Notice of Allowance for U.S. Appl. No. 11/551,125, mailed Apr. 25, 2011.

METHOD AND SYSTEM FOR RECOVERING AND PREPARING GLACIAL WATER

CROSS REFERENCE TO RELATED APPLICATIONS

This Application is a Divisional Application which claims the benefit of priority from U.S. patent application Ser. No. 11/551,125 filed Oct. 19, 2006, the entire disclosure of which is hereby incorporated herein by reference.

FIELD

The present invention relates to a method and system for preparing drinking water from an ice sheet or glacial body. Specifically, the present invention provides a way to categorize and group ice contained in an ice source, then prepare the categorized and grouped ice to be consumed as a beverage having unique characteristics and properties.

BACKGROUND

It has been known for many years to utilize, e.g., Greenland inland ice as a drinking water resource within the field of refreshing drinks or soft drinks based on the recognition that upon melting, the inland ice may be distributed to consumers as some of the purest naturally occurring water in the world. However, known methods have been disadvantageous, because some of the natural purity of the ice has been lost in the preparation of the ice as drinking water, after ice has been taken out from its natural occurrence, such as an iceberg. It has been necessary to melt the ice and then bottle or pack the water in containers permitting transport and distribution of the water to consumers.

This type of processing has been applicable not only to inland ice as can be found in Greenland, but is also useful in harvesting water from a glacier. Inland ice and glaciers are formed by yearly snowfall. Snowfall accumulates and compresses in an ice shelves over the course of many years to depths reaching over 4,000 meters in some areas. As the ice layers are compressed, and in the course of thousands of years, the ice moves towards ice rims and glaciers or other terminal points of the ice shelves. The glaciers calve and at short intervals yield an iceberg, which floats out to sea. These icebergs have typically been "caught" shortly thereafter before they are decomposed into undrinkable seawater. The ice is processed for the production of drinking water of a very high purity.

Glacial ice advances then retreats from year to year depending upon the climate around the glacier and typical snow accumulation. Glacier movements and shape shifting occur over very long periods of time (i.e., hundreds to thousands of years), but within historic memory such transformations in fewer than 100 years are not known. Presently, about 10 percent of the land in the world is covered with glaciers or ice shelves. Glaciers, ice shelves, ice caps and ice sheets store approximately 75 percent of the world's fresh water supply and cover over 15 million square kilometers. These frozen bodies of water have existed, as mentioned above, for thousands upon thousands of years. In Washington State alone, glaciers provide 470 billion of gallons of water each summer to consumers. Most of this water is used for drinking and the like. Furthermore, the Antarctic ice sheet has an age of over 40 million years.

There are several known techniques to determine the age of glaciers and ice sheets. Most of these methods employ drilling an ice core from the glacier or ice sheet then counting the layers inside of the ice core, much like counting rings in a tree to determine the age of a tree. A first method of dating ice cores consists of counting the annual layers. The basis of this method lies with looking for items that vary with the seasons in a consistent manner. Of these are items that depend on the temperature (colder in the winter and warmer in the summer) and solar irradiance (less irradiance in the winter and more in the summer). Once such markers of seasonal variations are found, they can be used to find the number of years that the ice core has accumulated over. Of the temperature dependent markers, the most important is the ratio of 180 to 160. The water molecules composed of H2 (180) evaporate less rapidly and condense more readily than water molecules composed of H2 (160). Thus, water evaporating from the ocean starts off as H2 (180) poor. As the water vapor travels towards the poles, it becomes increasingly poorer in H2 (180), since the heavier molecules tend to precipitate out first. This depletion is a temperature driven process, so the precipitation becomes more enriched with H2 (160), then is the case in the summer. Thus, each annual layer starts 180 rich, becomes 180 poor and ends up 180 rich.

A second method of dating ice cores is to use the age of previously determined markers to determine the age of various points in the ice core. This relies on accurately previously dated ice cores with accurately placed markers on them as a point of reference to determine the age of another ice core. Alternatively, this method can compare certain inclusions in an ice core with inclusions of another ice core that has been dated. Typically, inclusions are ash from volcanic eruptions and acidic layers from various weather anomalies.

There exist many other known methods of dating ice cores taken from a glacier or ice sheet. Furthermore, gases collected that were trapped inside of a layer of a given ice core can be dated using standard carbon 14 and/or chlorine 36 dating. The point is that there exist many known methods to date an ice core and thus date various layers in a glacier.

SUMMARY

It is one aspect of the present invention to date such glaciers and identify the age of various layers within a glacier or ice sheet. After various layers of the glacier or ice sheet have been dated, the glacier can be mined/tapped according to known processes. The glacier ice can be recovered and segmented into various layers. Each layer corresponds to a different, now determined, age. For example, a first layer may be 100 years old whereas a second layer may be 2000 years old. Once the layers are separated according to date, each dated layer of ice can be processed for consumption as drinking water or for some other type of beverage (e.g., soda, juice, spirits, beer, wine, etc.) Consumers will readily appreciate the advantage of drinking water that existed during the time of Shakespeare, King Arthur, or Jesus, for example.

Another aspect of the present invention relates to the appreciation of how to obtain (without sophisticated chemical analysis and re-creation of waters having certain qualities and lack of pollutants, etc.), water of a very specific time period and/or geographic region. It is therefore part of the present invention that the inventor recognized the problem, which then lead to the solution. The ability to obtain water having particularly desirous aspects (whether that be an absence of present day pollutants, many of which are man made), or the presence of certain natural organic elements (i.e., perhaps pollen of plants that may now be extinct, etc.) by its nature constitutes a new process and product. Similar to the patentability derived from the "purity" of the final product, it is believed that the present inventor is the first to appreciate how to arrive at the substantially pure aspect of water derived from previously frozen ice that is over hundreds, if not thousands, if not millions of years old. Furthermore the ability to date these layers of frozen ice and generally correspond it to a given time era is also advantageous in that different properties of water corresponding to different layers may exist. While it is acknowledged that ice has been melted to derive water in the past, it has not been accomplished under conditions that preserve the pristine aspects of such water and categorize those aspects according to their date.

In accordance with embodiments of the present invention, the ice from a glacier and/or ice sheet can be cut, drilled, and/or divided into various segments. The cutting, drilling, and/or division of the segments can separate the ice into either vertically or horizontally separated segments. The segments can then be further divided by date into other segments. These dated segments are then processed under strict hygienic conditions such that the properties of the water are maintained and not polluted. In a preferred embodiment, the processing of the ice is performed under an increased atmospheric pressure and where staff must be present during the operations. The staff should wear special clothing adapted to the purpose of maintaining the hygienic properties of the water. Preferably the cutting, drilling, and/or tapping and subsequent packaging of the ice are performed in accordance with FDA current good manufacturing practice for processing and bottling of bottled drinking water, 21 CFR 129.

The ice can be drilled from the top or may be extracted from the terminus of the glacier such that the layers are taken out directly without an intermediate step as required by the vertical recovery of the ice. Furthermore, various layers of the ice can be tapped and pumped in an effort to recover the water contained therein. It is one aspect of the present invention to provide a method of processing ice from a glacier or ice sheet. The ice is extracted from the reservoir, i.e., glacier or ice sheet. The ice is then segmented and categorized by date. Thereafter, each segmented section of ice is processed separately under hygienic conditions such that the pristine aspects of the water are maintained. The water is then packaged separately and labeled according to the date from which the ice existed. For example, renaissance water that came from the early 1400 AD era is bottled separate from water that existed at the time of Christ or around 0 BC. The water may be portioned into consumable units or into larger bulk quantities. Consumable units are generally portion sizes acquired by an individual consumer. Units ranging between .1 liters and 10 gallons can be partitioned. More preferably, 1.5 liter to 10 liters could be the partition size of the water. Generally, the water is partitioned into individual sellable units, preferably around one-half liter to one liter, due to the categorization of the ice and subsequent processing of the ice into water comprising different properties from one batch to the next. The inventive process merits a higher selling price of water than simply cutting up ice from a glacier and melting it. Consumers may be willing to pay a premium for water that traces its roots back to the same time that Leonardo da Vinci lived, for example. Therefore, reasonable sizing of the sellable units would be desired based on the attractiveness of the process provided by the present invention.

Alternatively, water from a particular era or containing certain properties could be sold in bulk quantities. Particularly, breweries or distilleries that have a long historic tradition could purchase large batches of dated water. They could then use water that dates back to their original product in order to recreate the original beverage that they used to produce. Many breweries and the like pride themselves on not changing certain recipes over the course of many years. Some breweries and distilleries have been creating the same product for over a hundred years. These companies would be able to purchase water that existed during the days of their founders and could create, market, and sell the "original" product to consumers with literally no changes from the true original. Consumers would be willing to pay a premium for a truly original pint of Guinness® or a bottle of Lagavulin scotch made from water dating back to 1816.

Another aspect of the present invention provides a system for categorizing, extracting, processing and packaging water into different historically categorized groups. In accordance with one embodiment, a recovery station is set on or near an ice source (e.g., glacier, ice sheet, ice cap, and the like). Also included is a recovery member that is operable to transmit ice from the ice source to the recovery station. In the recovery station, the ice can then be separated and categorized according to date and processed according to the methods described above.

A further aspect of the present invention provides a method for producing bottled water from glacial ice having a predetermined age. The method includes analyzing the age of a number of layers of glacial ice within an ice source. Then a first layer, whose age is known, is extracted in either a solid or liquid state. The first layer is extracted such that other layers remain substantially undisturbed. This allows the first layer to be substantially separated from the other layers of glacial ice, thereby isolating the characteristics of the water within the first layer. After the water has been extracted it is collected and directed into a container (e.g., a bottle, bag, or the like.) Once the water from the first layer has been effectively bottled or contained, an indication in the form of a tag or label is place on or around the bottle/container to reflect the characteristics of the water that is within the bottle/container.

Still a further aspect of the present invention provides for a way of recovering and preparing dated water in an economically viable fashion. In one embodiment, a number of containers are separated and filled with water (either from the ice source itself or from another source) in a frozen or liquid state. Water from various segments of the ice source are then extracted from the ice source and then placed into different containers. Essentially, a majority of the water in each container does not need to be extracted according to the costly process described herein. However, a non-trivial amount of categorized water is also in each container such that consumers can be assured that the water they are drinking is at least partially derived from a particular time period and thus has the unique characteristics of water from that time period. The primary water that is used (i.e., the non-categorized water) should be held to the highest purity standards so that when the categorized water is added, the unique characteristics of that water are not lost or disrupted.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

Figure 1:
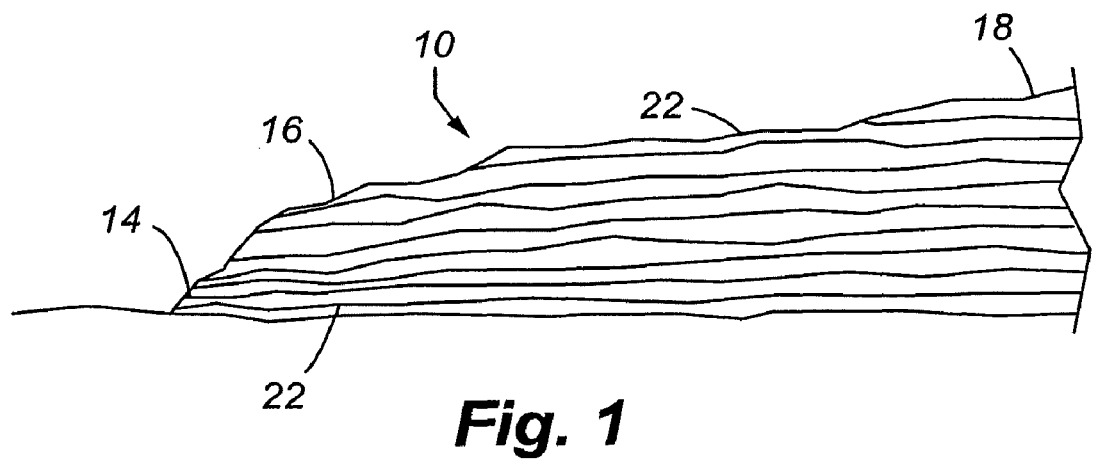
FIG. 1 depicts a cross-sectional side view of an ice source in accordance with one embodiment of the present invention.
Figure 2:
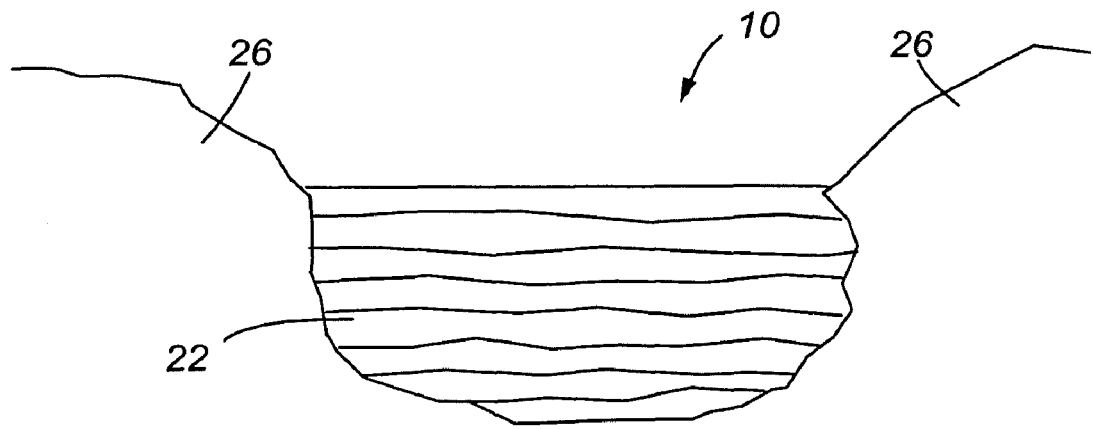
FIG. 2 depicts a cross-sectional front view of an ice source in accordance with another embodiment of the present invention.

The present invention is directed towards a method and system of recovering, grouping, and processing ice to form drinking water. With reference to FIGS. 1 and 2, an ice source 10 (e.g., glacier, ice sheet, ice cap, or the like) will be described. The ice source 10 comprises a plurality of layers 22. Each layer 22 of the ice source 10 corresponds to a different time period. Each year accumulation of precipitation in the form of typically snow fall or snow from wind and the like builds up on top of the ice source. Therefore, the further down a layer 22 is, the older it is relative to layers above it. Generally, ice and snow accumulate at the upper regions of the ice source in what is known as an accumulation zone 18. The accumulation zone 18 is typically defined by newer, less dense water. Because the ice source is made of water it flows but at a very slow rate. The ice source has a terminus 14 where the ice source ends and either land or water begins. Between the terminus 14 and the accumulation zone 18 there is an area known as the ablation area 16. Generally, the ablation area in contrast to the accumulation area is where snow, ice and the like tends to leave at a quicker rate than it accumulates. Therefore, generally older layers of ice are exposed at the surface as can be seen in FIG. 1 towards the ablation area 16 and the terminus 14 of an ice source 10. The fact that older layers of ice are exposed toward the ablation area 16 and the terminus 14 and of the ice source 10 makes it preferable to recover and process the ice towards the ablation area 16 and/or terminus 14 of the ice source 10, rather than recovering and processing the ice and/or snow from area closer to the accumulation zone 18 of the ice source 10. Generally ice sources at their terminus 14 of the source 10 are surrounded by land 26 as can be seen in FIG. 2. The layers 22 are exposed typically horizontally at the terminus or just behind the terminus 14 around the ablation area 16.

An ice source 10 is typically defined by the size and type of land that it covers. For example, and ice sheet is a dome-shaped mass of glacial ice that covers surrounding terrain and is greater than 50,000 km². An ice cap is much like and ice sheet but it covers less than 50,000 km². An ice shelf is a portion of an ice sheet that spreads out over water. A mountain glacier is a glacier that is confined by surrounding mountain terrain. Typically, glacier ice is defined by well-bonded ice crystals compacted from snow with a bulk density greater than 860 kg/m³. Other types of ice sources exist other than glacial ice. Specifically, firns can also provide water. A firn is defined as a rounded, well-bonded accumulation of snow that is older than one year. Typically, firns have a density greater than 550 kg/m³. Firns sometimes exist proximate to, or on top of glaciers and dated water can be recovered from them as well as from the glacier ice itself. Usually firns are located toward the accumulation zone 18 of an ice source 10.

Figure 3:
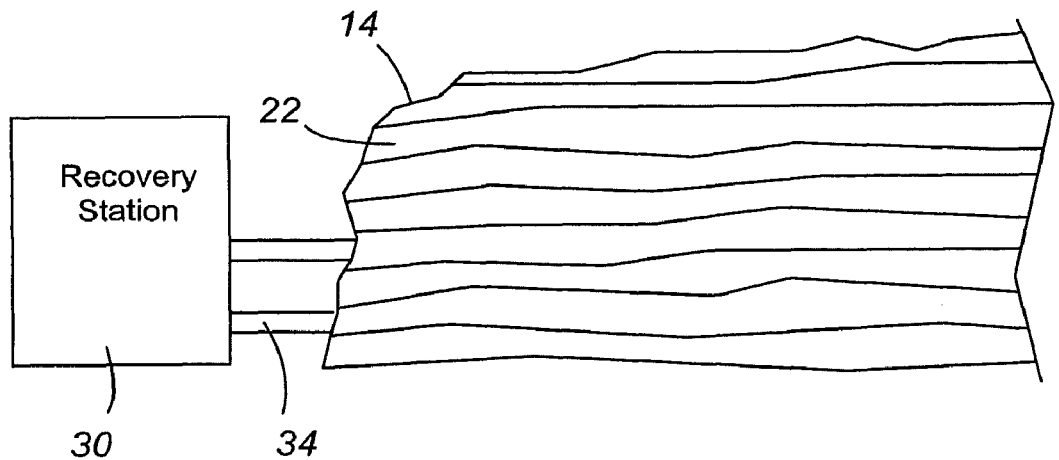
FIG. 3 depicts an ice and/or water recovery system in accordance with yet another embodiment of the present invention.

With reference to FIG. 3, one embodiment of the present invention will be described in some detail. In this embodiment, a recovery station 30 is located towards the terminus 14 of the ice source 10. The recovery station 30 may comprise, for example, a floating vessel, such as an ocean going ship. The recovery station 30 utilizes a recovery member 34 for instance, a tap and/or drill or conveyor mechanism to recover the ice and/or ice water from the ice source 10. Heating mechanisms (not shown) may also be employed as necessary to further enhance recovery of the ice/ice water. In a preferred embodiment, each layer or set of layers is processed separately thereby eliminating a separation step later in the processing of the ice. As can be appreciated, each layer 22 need not correspond to an exact year. As a matter of fact, a layer 22 of ice corresponding to a single year may be too small to be commercially exploitable because the mining of such a small layer would not yield enough product to sell. However, ice layers 22 can be grouped into a number of years, for example, a layer 22 may correspond to a span of 50 to 100 years. This would allow each layer 22 to correspond to a different century of history and may therefore appeal to different consumers. Furthermore, various layers 22 grouped into different categories based not only of their age, but on their chemical and physical properties. For example, a layer 22 may correspond to a time in history where various plants and/or other beneficial pollens were available and were therefore entrapped in the water and still are present in that layer 22. A layer higher than layer 22 may be grouped and have different properties than that of the layer below it. Therefore, layers can be grouped according not only to age but their properties. Furthermore, as the pressure continues to act on the lower ice layers, the physical properties of the layer 22 will change over time. For instance, the deionization of the water as pressure continues to push air bubbles out of the ice will result in a more pure and therefore healthier source of water.

Figure 4:
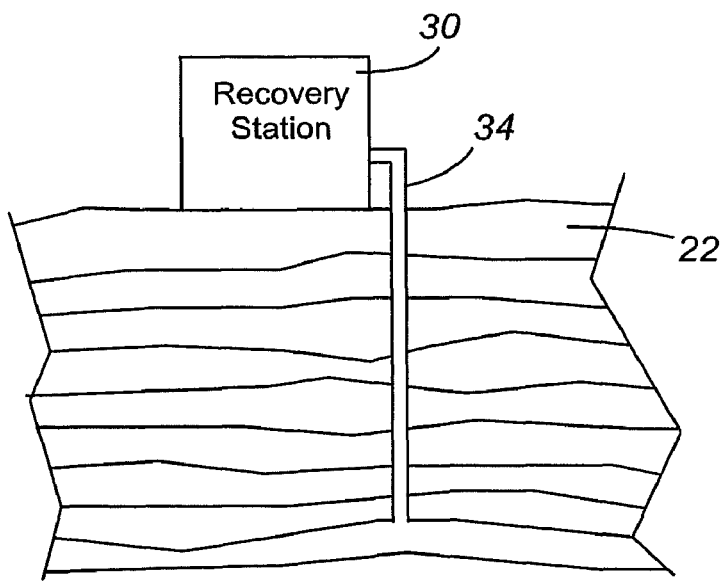
FIG. 4 depicts an ice and/or water recovery system in accordance with a further embodiment of the present invention.

With reference to FIG. 4, an alternative embodiment of the present invention will be described. In this configuration, the recovery station 30 is placed on top of the ice source 10 rather than next to it. The recovery member 34, which may be a pump, drill, set of drills, or the like, is inserted down into the ice source to recover the layers 22 of ice. This embodiment requires ice cores to be recovered then processed according to methods that will be described later. Specifically, the ice cores that are removed will need to be categorized after they are removed rather than before or during removal. In the embodiment where a recovery station is placed next to the ice source as depicted in FIG. 3, the categorization and grouping of layers 22 may be done previous to recovery of an ice layer 22. Whereas in the configuration depicted in FIG. 4, the ice cores must be removed prior to separation into groups.

There are several known methods of recovering and processing water recovered from ice sources. For example, PCT Application No. 00/39408 to Sundberg et al. describes a method and apparatus for utilizing glacier ice as drinking water, and is herein incorporated by this reference in its entirety. The apparatus comprises two stepwise operating and synchronized conveying lines, which cross each other and are perpendicular to each other. It also comprises a cutting station, a packing device, and a cutting device. Ice is cut from a glacier and packaged under hygienic conditions before it melts into liquid water. This process maintains the pristine aspects of the water retrieved from the ice source. Preferably, water is retrieved and processed from the lower layers of the ice source that potentially have more value than the upper layers that are not as old and have relatively fewer unique characteristics.

In still another embodiment of the present invention, the recovery station 30 may be a scraper, or the like, that removes layers 22 one at a time from the ice source. In this embodiment, only the new layers are used (i.e., layers less than a couple of hundred years old). If the recovery station 30 is an ice scraper or the like, the older layers may never be reached because continual accumulation on the top of the ice source 10 may preclude the recovery station 30 from ever getting below a certain depth.

Figure 5:
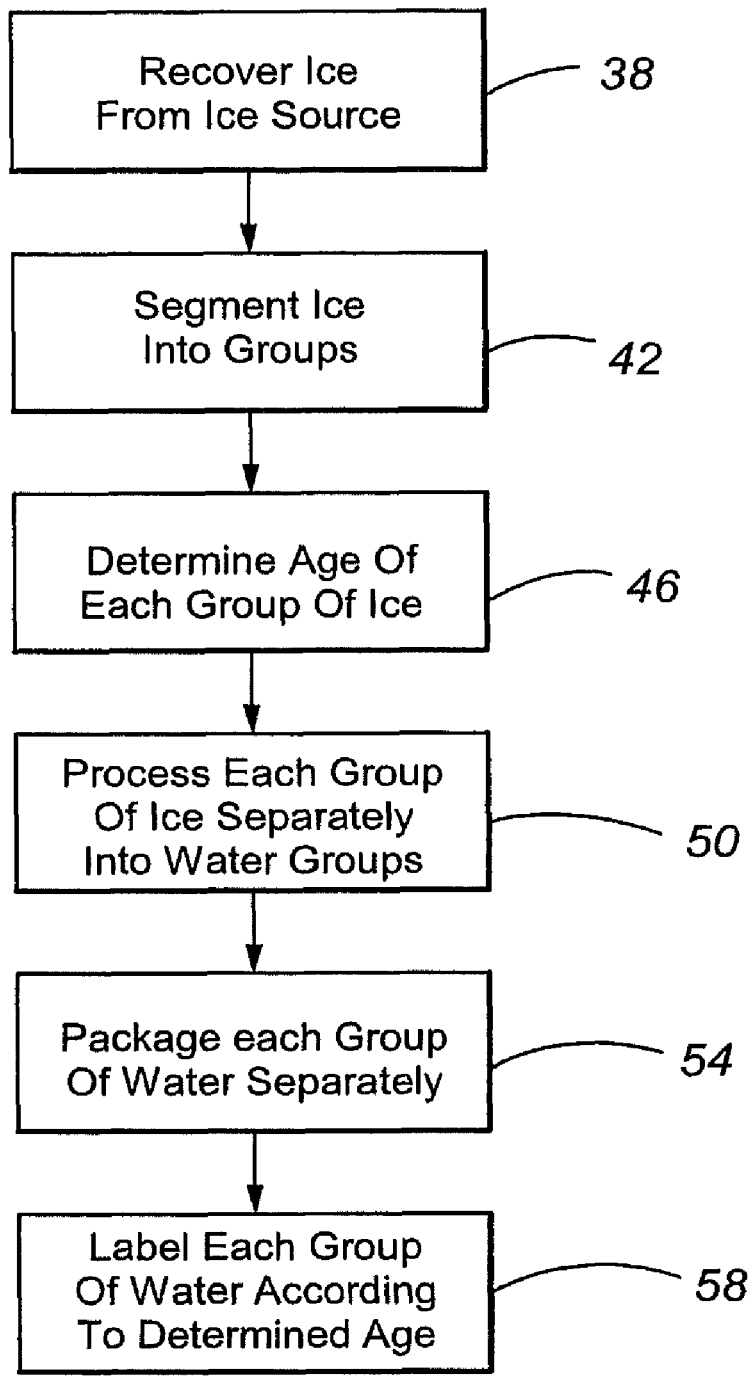
FIG. 5 is a flow chart depicting aspects of the operation of water recovery system in accordance with embodiments of the present invention in connection with grouping and separating water from an ice source.

With reference to FIG. 5, a method of categorizing and processing the ice from an ice source 10 will be described in detail. In step 38, ice is recovered from the ice source. Then the ice is segmented into groups in step 42. As described above, if the recovery station 30 is placed next to, specifically at the terminus 14 of an ice source 10, the ice may be segmented prior to recovery. However, in accordance with certain embodiments of the present invention, the ice may be removed first then segmented and grouped in step 42. In step 46, the age of each group of ice is determined. As described above, the age of the ice may have already been determined for each layer 22 and may have occurred prior to removal or mining of that particular ice layer. Once the ice is properly grouped according to either age, physical, and/or chemical properties, each grouping of ice is processed separately in step 50. Specifically, the ice is processed under hygienic and preferably sterile conditions such that contaminants are not introduced to the water thereby changing the chemical and physical properties of the water, which give it value. Preferably, the ice is processed into water groups in step 50 utilizing stainless steel materials and other sterile utensils. Then, in step 54, each group of water is packaged according to their age and/or physical and chemical properties. The water may be packaged into individual containers ranging between sizes of 0.1 liter to 10 liter. In a preferred range of 0.5 liters to 5 liters and more preferably between 1 to 2 liters.

In an alternative embodiment, a primary source of water that is not categorized and extracted as described above is mixed with an amount of categorized water that was extracted from the ice source 10. Ratios of the primary water and categorized water can vary depending on the desired selling price of the final product and the amount of available categorized water. If a consumer wishes to purchase a bottle of water made purely from dated water, then no other water is mixed with the dated water and subsequently a higher price may be demanded for the premium water. However, in order to create a more price friendly product, a larger ratio of primary water to dated water could be used.

A number of containers may be filled with amounts of the primary water in accordance with embodiments of the present invention. These containers may be placed proximate to the ice source or at a remote site. Regardless of the placement and size of the containers used an amount of dated water that has been categorized and extracted from the ice source 10 is added to a different container depending upon the characteristics of the water. For example, water from a first layer of the ice source 10 is placed into a first container with a first amount of primary water and water from a second layer of the ice source 10 is placed into a second container with a second amount of primary water. The amount of primary water used in each container may depend upon the characteristics of the dated water that is being added as well as the amount of dated water that can be recovered.

Figure 6:
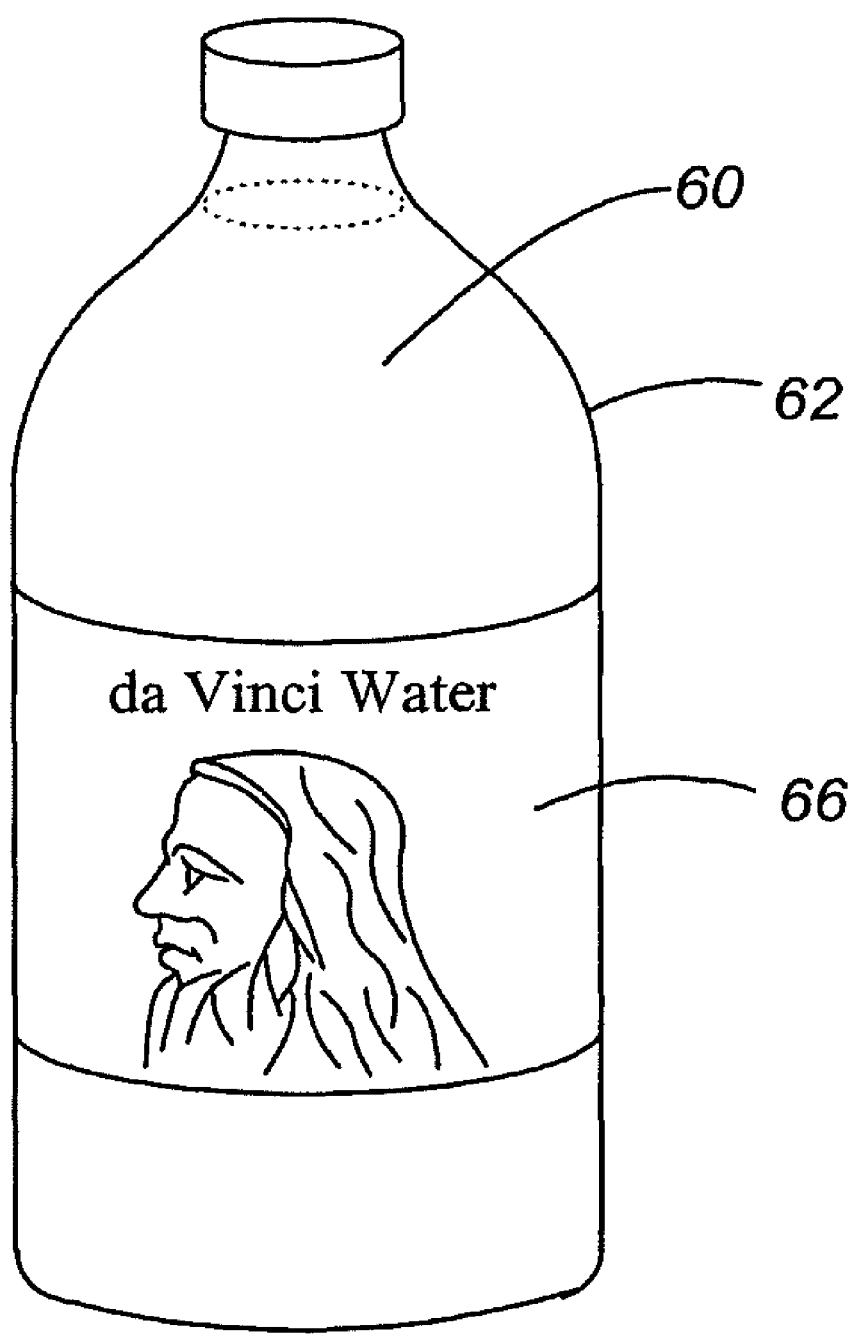
FIG. 6 depicts an exemplary final product in accordance with embodiments of the present invention.

Referring now to FIG. 6 a product produced in accordance with embodiments of the present discussion will be discussed. Ultimately, the final product is water or a beverage derived from water that has certain unique characteristics. These characteristics may include the age of the water, the chemical and/or physical properties of the water, and the taste of the water. After recovering water 60 from an ice source having these unique characteristics, the product is then bottled either in a solid or liquid state depending on the methods used to recover and process the water 60. The water 60 is collected in a container 62. Then, depending on the characteristics of the water 60, a label 66 is placed on the container 62 to provide an indication of the characteristics of the water 60. For example, water recovered from an ice source having an age of about 550 years may be labeled as "da Vinci Water" or "Renaissance Water" to reflect the characteristics of the water 60 contained within the container 62.

In various embodiments of the present invention, steps for recovering, segmenting, determining, and packaging the ice into their respective containers is described. As can be appreciated, various steps of the methods described can be completed in different orders depending on how the water is recovered and processed.

The foregoing discussion of the invention has been presented for purposes of illustration and description. Further the description is not intended to limit the invention to the form disclosed herein. Consequently, variations and modifications commensurate with the above teachings, within the skill or knowledge of the relevant art, are within the scope of the present invention. The embodiments described above are further intended to explain the best mode presently known of practicing the invention and to enable others skilled in the art to utilize the invention in other embodiments and with various modifications required by their particular application or use of the invention. It is intended that the appended claims be construed to include alternative embodiments to the extent permitted by the prior art.

What is claimed is:

1. A method of partitioning and preparing a beverage from a glacial ice source substantially adjacent to a navigatable waterway, comprising:
   dividing a glacial ice source into a plurality of layers;
   determining characteristics of water in each of the plurality of layers;
   recovering water from a first layer of the plurality of layers; and
   processing the water from the first layer, wherein characteristics of the water from the first layer remain substantially the same; and wherein the characteristics of said layers relate to at least one of age, purity, density, chemical content, and physical properties of the water.

2. The method of claim 1, wherein said step of recovering the ice source comprises providing a floating vessel present in said waterway to which vessel one of said ice or said water is transported.

3. The method of claim 1, wherein before the recovering step, the water is in a solid state and wherein after the processing step is performed, the water is in a liquid state.

4. The method of claim 1, wherein the recovering step comprises, inserting a recovery member into the first layer and extracting a portion of the water from the first layer in a solid state.

5. The method of claim 1, wherein the processing step is performed under substantially sterile conditions.

6. The method of claim 1, further comprising:
   recovering water from a second layer of the plurality of layers; and
   processing the water from the second layer, wherein characteristics of the water from the second layer differ from the characteristics of the water from the first layer, and wherein characteristics of the water from the second layer remain substantially the same.

7. The method of claim 1, wherein the water from the first layer has a density greater than about 550 kg/m$^3$.

8. The method of claim 1, wherein the water from the first layer has a density greater than about 860 kg/m$^3$.

* * * * *